United States Patent
Bolduc

(10) Patent No.: US 12,479,461 B2
(45) Date of Patent: Nov. 25, 2025

(54) PATH PLANNING FOR TOW VEHICLE AND TRAILER

(71) Applicant: Continental Autonomous Mobility US, LLC, Auburn Hills, MI (US)

(72) Inventor: Andrew Phillip Bolduc, Rochester Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 154 days.

(21) Appl. No.: 17/656,473

(22) Filed: Mar. 25, 2022

(65) Prior Publication Data
US 2023/0303112 A1     Sep. 28, 2023

(51) Int. Cl.
*B60W 60/00*     (2020.01)
*B60W 30/18*     (2012.01)
*G01C 21/34*     (2006.01)

(52) U.S. Cl.
CPC .... *B60W 60/001* (2020.02); *B60W 30/18036* (2013.01); *G01C 21/3407* (2013.01); *B60W 2520/06* (2013.01); *B60W 2530/203* (2020.02)

(58) Field of Classification Search
CPC ......... B60W 60/001; B60W 30/18036; B60W 2520/06; B60W 2530/203; G01C 21/3407; B62D 13/06; B62D 15/0285
USPC .............................. 701/25, 28, 41, 124, 514
See application file for complete search history.

(56) References Cited

U.S. PATENT DOCUMENTS

| | | | |
|---|---|---|---|
| 9,393,996 B2 | 7/2016 | Goswami et al. | |
| 10,086,870 B2 | 10/2018 | Gieseke | |
| 10,655,957 B2 | 5/2020 | Kozak | |
| 2007/0051547 A1 | 3/2007 | Fischer et al. | |
| 2007/0282503 A1* | 12/2007 | Luke | B62D 15/027 701/44 |
| 2014/0249723 A1* | 9/2014 | Pilutti | B60W 30/00 |
| 2014/0358424 A1* | 12/2014 | Lavoie | B60D 1/245 |
| 2014/0358429 A1 | 12/2014 | Shutko et al. | |
| 2015/0203156 A1* | 7/2015 | Hafner | G08G 1/143 701/36 |
| 2015/0210317 A1 | 7/2015 | Hafner et al. | |
| 2015/0217693 A1* | 8/2015 | Pliefke | H04N 7/183 |
| 2016/0114831 A1* | 4/2016 | Laine | G08G 1/168 701/41 |
| 2016/0129939 A1 | 5/2016 | Singh et al. | |

(Continued)

FOREIGN PATENT DOCUMENTS

DE     102008043675 A1     5/2010

OTHER PUBLICATIONS

The International Search Report and the Written Opinion of the International Searching Authority mailed on Jun. 14, 2023 for the counterpart PCT Application No. PCT/US2023/064957.

*Primary Examiner* — Ramon A. Mercado
*Assistant Examiner* — Ellis B. Ramirez

(57) ABSTRACT

A method of planning a path for reversing a trailer along a defined path a includes defining a desired end point for a trailer path and determining a set of reversing trailer curvatures for moving the trailer between each of a plurality of possible waypoints along a possible trailer path. A steering angle is determined for each of the curvatures. The reversing trailer path to the end point is then created based on a set of waypoints selected based on the determined reversing trailer curvature at each of the plurality of possible waypoints that meets a defined path determination criteria.

24 Claims, 3 Drawing Sheets

(56) References Cited

U.S. PATENT DOCUMENTS

| | | |
|---|---|---|
| 2017/0137061 A1 | 5/2017 | Azuma et al. |
| 2020/0001920 A1* | 1/2020 | Hejase ............ B60W 30/18036 |
| 2020/0180691 A1 | 6/2020 | Sandblom et al. |
| 2020/0247471 A1* | 8/2020 | Grodde .................. G06V 20/58 |

* cited by examiner

PATH PLANNING FOR TOW VEHICLE AND TRAILER

The present disclosure relates to method and system for planning a path for a vehicle and trailer.

BACKGROUND

Autonomously operated or assisted vehicles may aid a vehicle operator and/or take over control of the vehicle. Autonomous and semi-autonomous operation is of use for vehicle maneuvers that are most challenging to a vehicle operator. For example, parallel parking and reversing of a vehicle with a trailer. Reversing of a vehicle trailer is a maneuver that most drivers do not perform often and therefore autonomous or semi-autonomous assist systems are of great value to vehicle consumers.

Path planning is accomplished in various ways based on sensor and generated local area maps. Path planning for a reversing trailer is challenging as such a maneuver is naturally unstable. Moreover, objects and practical angle limitations between a trailer and tow vehicle may further complicate creation of an efficient reversing trailer path. Automotive system and parts manufactures continually seek to improve vehicle operation, efficiencies and customer satisfaction.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of planning a path for reversing a trailer along a defined path according to a disclosed exemplary embodiment includes, among other possible things, defining a desired end point for a trailer path, determining a set of reversing trailer curvatures for moving the trailer between each of a plurality of possible waypoints along a possible trailer path, determining a steering angle for a tow vehicle coupled to the trailer corresponding to each of the determined set of reversing trailer curvatures, and determining the trailer path to the end point based on a set of waypoints selected based on the determined reversing trailer curvature at each of the plurality of possible waypoints that meets a defined path determination criteria.

Another exemplary embodiment of the foregoing method further comprises determining a start pose of the trailer at the starting point within a predefined local reference frame.

Another exemplary embodiment of any of the foregoing methods further comprises defining a finish pose of the trailer at the end point within the local reference frame.

Another exemplary embodiment of any of the foregoing methods further comprises defining a distance between the possible way.

In another exemplary embodiment of any of the foregoing methods, the defined path determination criteria comprises a shortest distance.

In another exemplary embodiment of any of the foregoing methods, the defined path determination comprises a predefined range of steering angles and each of the waypoints selected correspond with a reversing trailer curvature attainable with a steering angle within the predefined range of steering angles.

In another exemplary embodiment of any of the foregoing methods, the predefined range of steering angles is less than a maximum range of a tow vehicle steering system.

In another exemplary embodiment of any of the foregoing methods, the tow vehicle includes a controller with a memory storing computer executable instructions executable by a controller and further comprising prompting the controller to determine the set of reversing trailer curvatures according to the stored computer executable instructions.

In another exemplary embodiment of any of the foregoing methods, the tow vehicle includes a controller with a memory storing computer executable instructions executable by a controller and further comprising prompting the controller to determine the steering angle corresponding to each of the determined set of reversing trailer curvatures according to the stored computer executable instructions.

An autonomous vehicle control system according to another exemplary embodiment includes, among other possible things, a controller with computer executable instructions configured to determine, when executed by at least one processor, a path for reversing a trailer from a starting point to a desired end point, wherein the determination of the reversing trailer path includes defining a desired end point for a trailer path, determining a set of reversing trailer curvatures for moving the trailer between each of a plurality of possible waypoints along a possible trailer path, determining a steering angle for a tow vehicle coupled to the trailer corresponding to each of the determined set of reversing trailer curvatures, and determining the trailer path to the end point based on a set of waypoints selected based on the determined reversing trailer curvature at each of the plurality of possible waypoints that meets a defined path determination criteria.

In another embodiment of the foregoing autonomous vehicle control system, the controller is further configured to determine a start pose of the trailer at the starting point within a predefined local reference frame and a desired finish pose of the trailer at the end point within the local reference frame.

In another embodiment of any of the foregoing autonomous vehicle control systems, the defined path determination comprises a predefined range of steering angles and the controller is further configured to select each of the waypoints that correspond with a reversing trailer curvature attainable with a steering angle within the predefined range of steering angles.

In another embodiment of any of the foregoing autonomous vehicle control systems, the predefined range of steering angles is less than a maximum range of a tow vehicle steering system.

Another embodiment of any of the foregoing autonomous vehicle control system further includes a sensor system disposed within the tow vehicle for providing information indicative of a pose of the trailer and to vehicle odometry.

In another embodiment of any of the foregoing autonomous vehicle control systems, the controller includes a memory device in communication with the processor, the memory device including the computer executable instructions.

A computer readable medium according to another exemplary embodiment includes, among other possible things, instructions executable by a controller configured to determine, when executed by at least one processor, a steering angle of a tow vehicle required to maneuver an attached trailer along a predefined path, wherein the instructions include, instructions prompting the controller to define a desired end point for a trailer path, instructions prompting the controller to determine a set of reversing trailer curvatures for moving the trailer between each of a plurality of possible waypoints along a possible trailer path, instructions prompting the controller to determine a steering angle for a tow vehicle coupled to the trailer corresponding to each of the determined set of reversing trailer curvatures, and instructions prompting the controller to determine the trailer path to the end point based on a set of waypoints selected based on the determined reversing trailer curvature at each of the plurality of possible waypoints that meets a defined path determination criteria.

Another embodiment of the foregoing computer readable medium further includes instructions prompting the controller to determine a start pose of the trailer at the starting point within a predefined local reference frame and a desired finish pose of the trailer at the end point within the local reference frame.

Another embodiment of any of the foregoing computer readable mediums further includes instructions prompting the controller to select each of the waypoints that correspond with a reversing trailer curvature attainable with a steering angle within the predefined range of steering angles.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
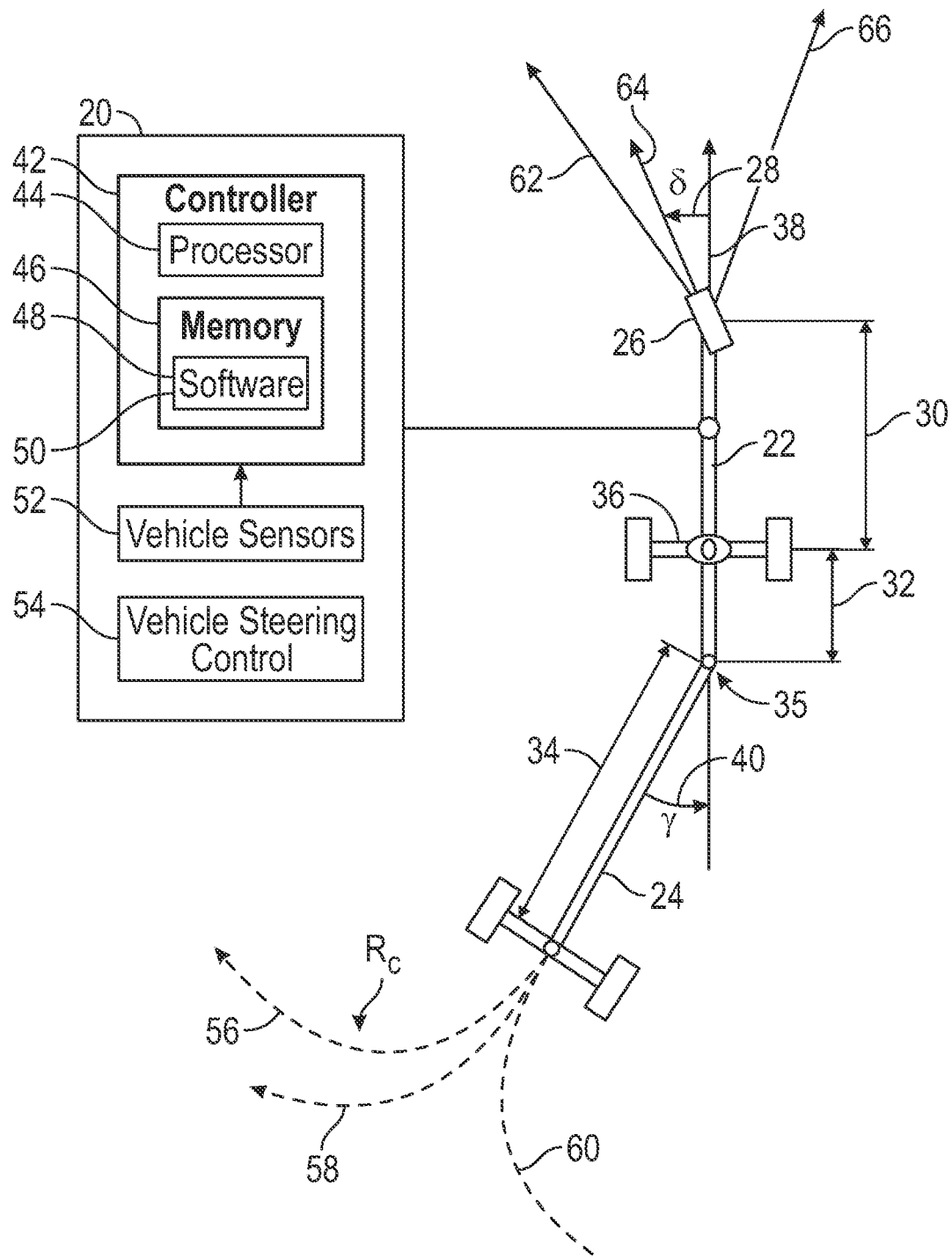
FIG. 1 is a schematic illustration of a tow vehicle including a vehicle control system for planning a path for reversing a trailer.

Referring to FIG. 1, a control system 20 for planning a reversing trailer path utilizes information regarding different trailer curvature paths corresponding to different tow vehicle steering angles. The example control system 20 is configured to determine a set of trailer curvatures 56, 58, and 60 at each waypoints along a potential reversing trailer path. A corresponding steering angle 62, 64 and 66 is determined for each of the trailer curvatures 56, 58 and 60. The curvatures 56, 58 and 60 along with the steering angles 62, 64 and 66 are utilized by the control system 20 to create a reversing trailer path that meets predefined criteria. The predefined criteria can include a shortest distance, the fastest route and/or any other criteria for evaluating and selecting a desired reversing trailer path.

The tow vehicle 22 includes a steered wheel 26 that is spaced apart from a vehicle axle 36. The tow vehicle 22 includes a steering control system 54 for moving the steered wheel. A wheel base 30 is the distance between the steering wheel 26 and the vehicle axle 36 and a hitch length 32 is a distance between the axle 36 and a coupling 35. The trailer 24 includes a wheel base 34 from the coupling 35 to the trailer axle 36.

An angle 40 between a center line of the tow vehicle 22 and the trailer 24 is created in response to a steering angle 28. The steering angle 28 is provided by a steered wheel 26 of the two vehicle 22. The angle 40 should be constrained within a limited range to provide practical maneuvering of the trailer 24. As appreciated, a large angle 40 may result in an orientation between the tow vehicle 22 and the trailer 22 that does not provide for further movement nor is practical for maneuvering of reversing trailer 24. For example, if the trailer 24 jackknifes relative to the tow vehicle, no further reversing is possible. The example control system 20 prevents the use of such impractical trailer reversing angles.

The control system 20 includes a controller 42 that includes a processor 44 and a memory device 46 that holds software instructions 48. The memory device 46 may include a computer readable medium 50 that holds the software instructions 48. The software instructions prompt the processor and controller to determine specific reversing trailer curvatures at each of a plurality of waypoints.

The example controller 42 may be a separate controller dedicated to the control system 20 are may be part of an overall vehicle controller. Accordingly, example controller 42 relates to a device and system for performing necessary computing and/or calculation operations of the control system 20. The controller 42 may be specially constructed for operation of the control system 20, or it may comprise at least a general-purpose computer selectively activated or reconfigured by software instructions 48 stored in the memory device 46. The computing system can also consist of a network of (different) processors.

The memory device 46 provides for the storage of the software instructions 48 that prompt operation of the controller 42. The software instructions 48 may be embodied in a computer program that uses data obtained from the sensor systems 52 and data stored in the memory device 46 that may be required for its execution.

The instructions 48 for configuring and operating the controller 42, the control system 20 and the processor 44 are embodied in software instructions that may be stored on the computer readable medium 50. The computer readable medium 50 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 48 may be saved in the memory device 46. The disclosed memory device 46, may can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 48 in the memory device 46 may include one or more separate programs, each of which includes an ordered listing of executable instructions for implementing logical functions. The disclosed controller 42 is configured to execute the software instructions 48 stored within the memory device 46, to communicate data to and from the memory device 48, and to generally control operations pursuant to the software. Software in memory, in whole or in part, is read by the processor 44, perhaps buffered within the processor, and then executed.

At each of a plurality of waypoints along a trailer reversing path, a set the trailer reversing curvature at each waypoint, a steering angle corresponding with each of those waypoints is also determined. Utilizing the trailer curvature and the corresponding steering angle, a path between a starting point and desired end point is determined according to predetermined criteria.

Figure 2:
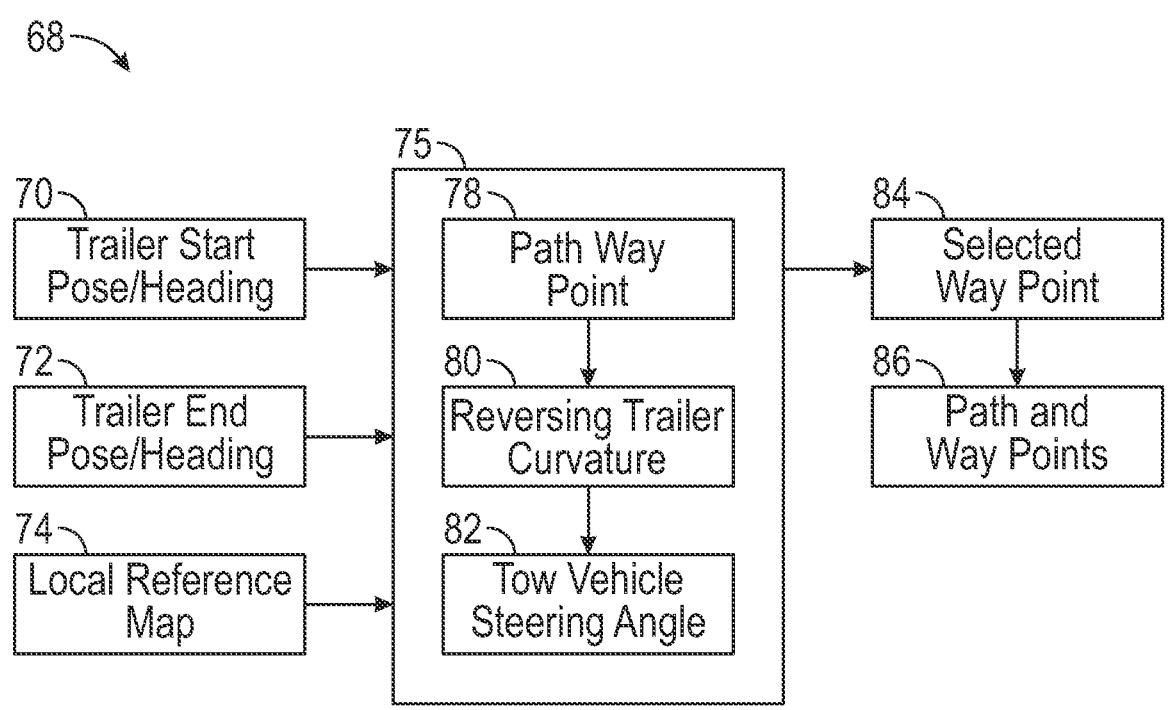
FIG. 2 is a flow diagram of an example process for determining a reversing trailer path.

Referring to FIG. 2, with continued reference to FIG. 1, a flow diagram 68 schematically illustrates the process steps that the control system 20 proceeds through to determine the desired path. The process utilizes a trailer start pose and heading indicated at 70. The trailer start pose and heading is determined by vehicle sensors 52 that are disposed within the tow vehicle 22. The vehicle sensors 52 can include cameras, radar systems, inertial measurement units, and lidar systems as well as any other vehicle sensor system that provides information indicative of vehicle odometry. Information indicative of the trailer start pose and heading 70 are provided to a path planning module 75.

A desired trailer end pose heading schematically indicated at 72 is determined and provided to the path planning module 75. Both the trailer start pose and heading and trailer end pose and heading are indicated with reference to a local reference map schematically indicated at 74. The local reference map 74 is provided to the path planning module 75. The trailer start pose and heading 70, trailer end pose and heading 72, along with the local reference map 74 are inputs for the path planning module 75.

The path planning module 75 determines specific reversing trailer curvatures indicated at 80 along with a tow vehicle steering angle 82 at each of a plurality of path waypoints 78. At each path waypoint 78, a set of reversing trailer curvatures is determined. The reverse trailer curvatures include the plurality of trailer curvatures 56, 58, 60. It should be appreciated, that only a few trailer curvatures are shown by way of example. Additional curvatures may be determined within the scope and contemplation of this disclosure.

Each of these curvatures 56, 58 and 60 are provided in response to a specific tow vehicle steering angle. Accordingly, the path planning module 75 determines a steering angle 62, 64 and 68 for each of the curvatures 56, 58 and 60. The determination of the steering angles in the module 75 is schematically indicated at 82.

In one example embodiment, the steering angle for each trailer curvature is provided by Equation 1.

$$\tan^{-1} \frac{\left(\cos(\gamma) + \frac{\sin(\gamma) R_c}{L_T}\right) L_{WB}}{\left(\sin(\gamma) - \frac{\cos(\gamma) R_c}{L_T}\right) L_H} \quad \text{Equation 1}$$

Where:
$R_c$ is the desired trailer curvature;
$\delta$ is the vehicle steered wheel angle (bounded between the maximum turning angle, $\pm \delta_{max}$);
$\gamma$ is the hitch angle;
$L_T$ is the trailer wheelbase;
$L_{WB}$ is the vehicle wheelbase; and
$L_H$ is the length of the hitch (from vehicle axle to hitch point).

The steering angle 28 that provides the different radii of curvature is constrained within a predefined range. The predefined range of tow vehicle steering angles is less than the maximum range of steering angles that is possible by the tow vehicle 22. As appreciated, some possible steering angles may result in a reversing trailer curvature that is not practical nor desired for use in a trailer reversing pay. For example, any steering angle 28 that results in a jack-knife of the trailer 24 is not practical and not utilized. Accordingly, only those curvatures 56, 58 and 60 that correspond with steering angles 28 within the predefined range are considered. The steering angle range is less than maximum angles and may vary depending on a location along one of the proposed way points.

Path planning proceeds from one way point to another way point along a proposed path. The module 75 selects a plurality of way points as indicated at 78 at which the curvature and steering angle are determined. Accordingly, in this example, the vehicle path planning module 75 determines a plurality of reverse trailer curvatures 28 at each selected waypoint. Corresponding tow vehicle steering angles are also determined.

Once the path creation module 75 has determined a corresponding tow vehicle steering angle 28 for the set of trailer curvatures 56,58 and 60 at each waypoint, one of the waypoints is selected depending on predetermined criteria. As appreciated, one criteria is to provide the shortest most efficient route for reversing the trailer between a starting point and an end point. The process of determining a trailer curvature 80 and corresponding tow vehicle steering angles 82 proceeds for each way point from a starting point to a desired end point.

Figure 3:
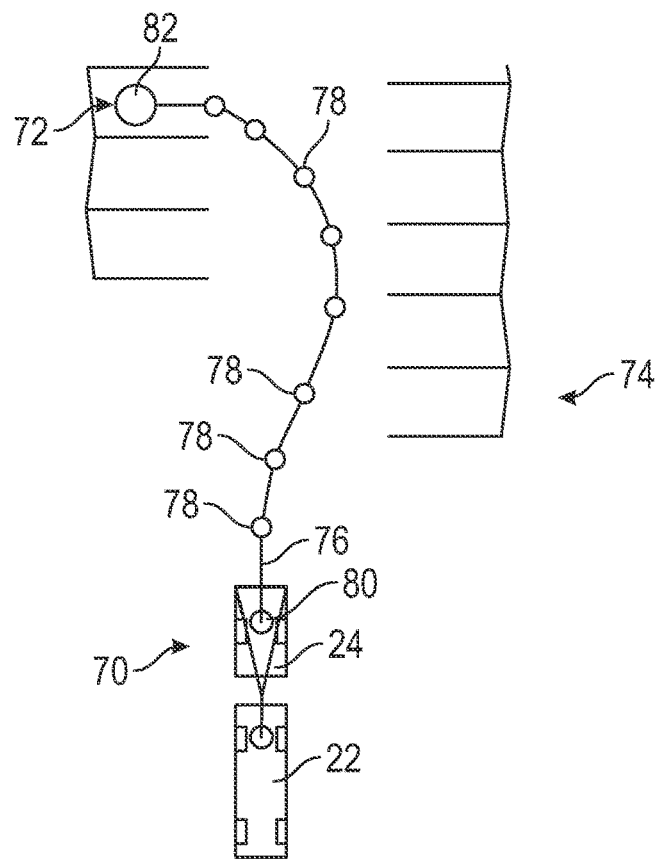
FIG. 3 is a schematic illustration of a tow vehicle and trailer at a start point.

Referring to FIG. 3, with continued reference to FIGS. 1 and 2, the tow vehicle 22 and the trailer 24 are schematically shown within a local reference map 74. The tow vehicle 22 and trailer 24 pose is schematically shown at a start point 80. A proposed path 76 is schematically shown and includes the plurality of waypoints 78. At each waypoint 78, a set of trailer curvatures 56, 58 and 60 as shown in FIG. 1 is determined. The corresponding steering angles 62, 64 and 66 as shown in FIG. 1 are also determined. From this information, the path 76 from one waypoint 78 to another waypoint is determined. The system 20 proceeds for each waypoint 78 along the path 76 until a desired path between the starting point 80 and an end point 84 at an end pose and heading 70 and a desired end position 72 is obtained.

Figure 4:
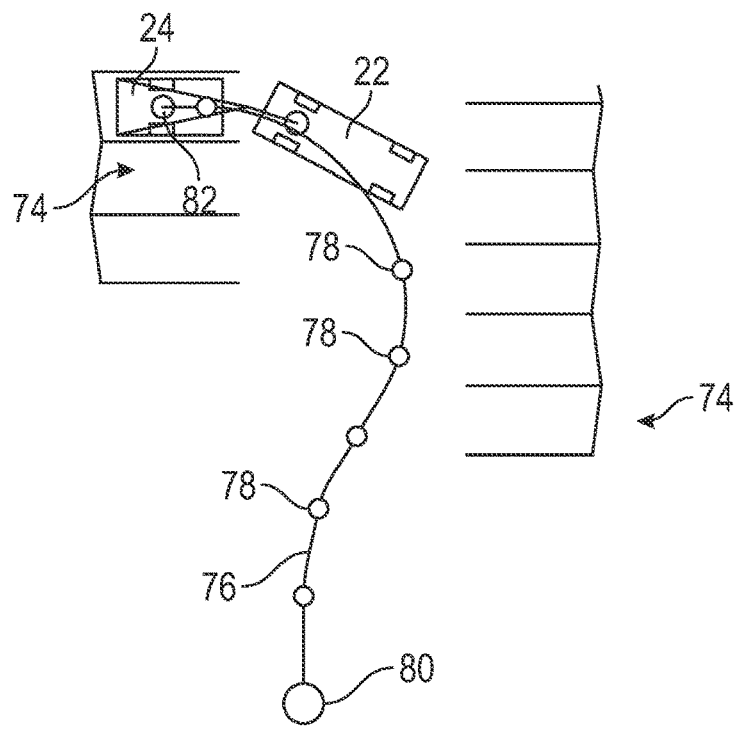
FIG. 4 is a schematic illustration of the tow vehicle trailer at an end point.

Referring to FIG. 4, the trailer 24 and tow vehicle 22 is shown at the end point 84 with the end trailer pose and heading 74. The path 76 to the end point 84 has been determined by selecting waypoints 78 that corresponds with a trailer curvature and steering angle that meet predefined criteria to form the path 76.

It should be appreciated that a plurality of path planning algorithms and features may be included and operated in concert with the disclosed example method. In one example, a variation of a hybrid A* path planning algorithm is utilized. Operation of the hybrid A* path planning algorithm according to an example disclosed embodiments occurs as commonly known with the addition of the evaluation of trailer curvatures and respective steering angles at each waypoint.

Accordingly, rather than a fixed set of steering wheel inputs, the example proposed method utilizes a series of reversing trailer curvature functions to determine corresponding steering angles. A steering angle is calculated for each of the plurality of curvatures at each waypoint 78. Incorporation of the example trailer curvature features and constrained steering angles provides for the creation of a path that includes practical and achievable trailer reversing maneuvers.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of planning a path for reversing a trailer along a defined path comprising:
   defining, by at least one processor, a desired end point for a trailer path;
   determining, by the at least one processor, a set of reversing trailer curvatures for moving the trailer between each of a plurality of waypoints along a possible trailer path, wherein a set of reversing trailer curvatures is determined at each waypoint, each reversing trailer curvature being a curvature for the trailer to take from the waypoint such that there are a plurality of different reversing trailer curvatures for the trailer from the waypoint extending in different directions from each other;
   for each waypoint of the plurality of waypoints, determining, by the at least one processor, a steering angle for a tow vehicle coupled to the trailer corresponding to each of the determined set of reversing trailer curvatures corresponding to the waypoint such that there is a distinct steering angle determined for each reversing trailer curvature at each waypoint; and
   determining the trailer path to the end point based on a set of waypoints selected based on the determined reversing trailer curvature at each of the plurality of possible waypoints that meets a defined path determination criteria.

2. The method as recited in claim 1, further comprising determining a start pose of the trailer at the starting point within a predefined local reference frame.

3. The method as recited in claim 2, further comprising defining a finish pose of the trailer at the end point within the local reference frame.

4. The method as recited in claim 3, further comprising defining a distance between the possible way.

5. The method as recited in claim 1, wherein the defined path determination criteria comprises a shortest distance.

6. The method as recited in claim 1, wherein the defined path determination comprises a predefined range of steering angles and each of the waypoints selected correspond with a reversing trailer curvature attainable with a steering angle within the predefined range of steering angles.

7. The method as recited in claim 6, wherein the predefined range of steering angles is less than a maximum range of a tow vehicle steering system.

8. The method as recited in claim 1, wherein the tow vehicle includes a controller with a memory storing computer executable instructions executable by a controller and further comprising prompting the controller to determine the set of reversing trailer curvatures according to the stored computer executable instructions.

9. The method as recited in claim 1, wherein the tow vehicle includes a controller with a memory storing computer executable instructions executable by a controller and further comprising prompting the controller to determine the steering angle corresponding to each of the determined set of reversing trailer curvatures according to the stored computer executable instructions.

10. An autonomous vehicle control system comprising:
    a controller with computer executable instructions configured to determine, when executed by at least one processor of the controller, a path for reversing a trailer from a starting point to a desired end point, wherein the determination of the reversing trailer path includes:
    defining a desired end point for a trailer path;
    determining a set of reversing trailer curvatures for moving the trailer between each of a plurality of possible waypoints along a possible trailer path, wherein a set of reversing trailer curvatures is determined at each waypoint, each reversing trailer curvature being a curvature for the trailer to take from the waypoint such that there are a plurality of different reversing trailer curvatures for the trailer from the waypoint extending in different directions from each other;
    for each waypoint of the plurality of waypoints, determining a steering angle for a tow vehicle coupled to the trailer corresponding to each of the determined set of reversing trailer curvatures corresponding to the waypoint such that there is a distinct steering angle determined for each reversing trailer curvature at each waypoint; and
    determining the trailer path to the end point based on a set of waypoints selected based on the determined reversing trailer curvature at each of the plurality of possible waypoints that meets a defined path determination criteria.

11. The autonomous vehicle control system as recited in claim 10, wherein the controller is further configured to determine a start pose of the trailer at the starting point within a predefined local reference frame and a desired finish pose of the trailer at the end point within the local reference frame.

12. The autonomous vehicle control system as recited in claim 10, wherein the defined path determination comprises a predefined range of steering angles and the controller is further configured to select each of the waypoints that correspond with a reversing trailer curvature attainable with a steering angle within the predefined range of steering angles.

13. The autonomous vehicle control system as recited in claim 12, wherein the predefined range of steering angles is less than a maximum range of a tow vehicle steering system.

14. The autonomous vehicle control system as recited in claim 10, further including a sensor system disposed within the tow vehicle for providing information indicative of a pose of the trailer and to vehicle odometry.

15. The autonomous vehicle control system as recited in claim 10, wherein the controller includes a memory device in communication with the processor, the memory device including the computer executable instructions.

16. A computer readable medium comprising instructions executable by a controller configured to determine, when executed by at least one processor, a steering angle of a tow vehicle required to maneuver an attached trailer along a predefined path, wherein the instructions include:

instructions prompting the controller to define a desired end point for a trailer path;

instructions prompting the controller to determine a set of reversing trailer curvatures for moving the trailer between each of a plurality of possible waypoints along a possible trailer path, wherein a set of reversing trailer curvatures is determined at each waypoint, each reversing trailer curvature being a curvature for the trailer to take from the waypoint such that there are a plurality of different reversing trailer curvatures for the trailer from the waypoint extending in different directions from each other;

instructions prompting, for each waypoint of the plurality of waypoints, the controller to determine, at each waypoint, a steering angle for a tow vehicle coupled to the trailer corresponding to each of the determined set of reversing trailer curvatures corresponding to the waypoint such that there is a distinct steering angle determined for each reversing trailer curvature at each waypoint; and instructions prompting the controller to determine the trailer path to the end point based on a set of waypoints selected based on the determined reversing trailer curvature at each of the plurality of possible waypoints that meets a defined path determination criteria.

17. The computer readable medium as recited in claim 16, further including instructions prompting the controller to determine a start pose of the trailer at the starting point within a predefined local reference frame and a desired finish pose of the trailer at the end point within the local reference frame.

18. The computer readable medium as recited in claim 17, further including instructions prompting the controller to select each of the waypoints that correspond with a reversing trailer curvature attainable with a steering angle within the predefined range of steering angles.

19. The method as recited in claim 1, wherein the steering angle for each reversing trailer curvature at each waypoint is determined according to $$\tan^{-1} \frac{\left(\cos(\gamma) + \frac{\sin(\gamma)R_c}{L_T}\right)L_{WB}}{\left(\sin(\gamma) - \frac{\cos(\gamma)R_c}{L_T}\right)L_H}$$

wherein $R_c$ is the desired trailer curvature, $\delta$ is the vehicle steered wheel angle, $\gamma$ is the hitch angle, $L_T$ is the trailer wheelbase, $L_{WB}$ is the vehicle wheelbase and $L_H$ is the length of the hitch from vehicle axle to hitch point.

20. The autonomous vehicle control system as recited in claim 10, wherein the steering angle for each reversing trailer curvature at each waypoint is determined according to $$\tan^{-1} \frac{\left(\cos(\gamma) + \frac{\sin(\gamma)R_c}{L_T}\right)L_{WB}}{\left(\sin(\gamma) - \frac{\cos(\gamma)R_c}{L_T}\right)L_H}$$

wherein $R_c$ is the desired trailer curvature, $\delta$ is the vehicle steered wheel angle, $\gamma$ is the hitch angle, $L_T$ is the trailer wheelbase, $L_{WB}$ is the vehicle wheelbase and $L_H$ is the length of the hitch from vehicle axle to hitch point.

21. The method as recited in claim 1, wherein the steering angle for each reversing trailer curvature at each waypoint is based on a desired trailer curvature, a vehicle steered wheel angle, a hitch angle, a trailer wheelbase of the trailer, a vehicle wheelbase of the tow vehicle, and a length of a hitch from vehicle axle the tow vehicle to a hitch point.

22. The method as recited in claim 1, wherein at each waypoint, the reversing trailer curvatures from the set of reversing trailer curvatures comprises at least three reversing trailer curvatures.

23. The computer readable medium as recited in claim 16, wherein the steering angle for each reversing trailer curvature at each waypoint is determined according to $$\tan^{-1} \frac{\left(\cos(\gamma) + \frac{\sin(\gamma)R_c}{L_T}\right)L_{WB}}{\left(\sin(\gamma) - \frac{\cos(\gamma)R_c}{L_T}\right)L_H}$$

wherein $R_c$ is the desired trailer curvature, $\delta$ is the vehicle steered wheel angle, $\gamma$ is the hitch angle, $L_T$ is the trailer wheelbase, $L_{WB}$ is the vehicle wheelbase and $L_H$ is the length of the hitch from vehicle axle to hitch point.

24. The computer readable medium as recited in claim 16, wherein at each waypoint, the reversing trailer curvatures from the set of reversing trailer curvatures comprises at least three reversing trailer curvatures.

\* \* \* \* \*